United States Patent [19]

Groff

[11] Patent Number: 4,654,642

[45] Date of Patent: Mar. 31, 1987

[54] TAMPERPROOF CLASSROOM NOISE ALARM

[76] Inventor: James W. Groff, P.O. Box 38, Morgan Hill, Calif. 95037

[21] Appl. No.: 788,805

[22] Filed: Oct. 18, 1985

[51] Int. Cl.$^4$ .............................................. G08B 21/00
[52] U.S. Cl. ...................................... 340/573; 73/646; 307/117; 340/540; 340/687
[58] Field of Search ............... 340/540, 573, 527, 687; 73/645-7; 179/1.1; 181/0.5; 307/117; 381/57

[56] References Cited

U.S. PATENT DOCUMENTS

| | | | |
|---|---|---|---|
| 4,307,385 | 12/1981 | Evans et al. | 340/540 |
| 4,346,374 | 8/1982 | Groff | 340/573 |
| 4,416,155 | 11/1983 | Kirby | 340/573 X |
| 4,481,504 | 11/1984 | Scott, II | 340/573 |
| 4,529,973 | 7/1985 | Blamberg | 340/573 |

*Primary Examiner*—Glen R. Swann, III
*Assistant Examiner*—Thomas J. Mullen, Jr.

[57] ABSTRACT

A tamperproof noise alarm for use in a school classroom to detect noise exceeding a predetermined intensity and duration and, in turn, warn both teacher and students when excessive noise has been detected. The noise alarm aids the instructor in preventing excessive classroom noise which can and does disrupt and destroy a given learning situation. A sensitivity control is provided to allow the instructor to determine the noise level at which the alarm will automatically respond. Alarm circuitry is not enabled until a first excessive noise occurs. A closely spaced second excessive noise causes an audible alarm to sound. When switched to a "delay" mode, the noise alarm is more tolerant of occassional classrool noise and will not sound a warning unless additional noise occurs subsequent to a timed delay of several seconds. The noise alarm also provides a digital readout, displaying how many times the audible alarm has been triggered, thus providing the instructor with a temporary record which can be used to reinforce acceptable classroom noise levels. Other controls are provided, allowing the instructor to reset the digital readout to zero, or to place the alarm in a "hold" mode, so that the alarm is temporarily disabled without disturbing any count which is displayed by the digital readout. Tamperproof circuitry within the noise alarm causes a two-tone alarm to sound repeatedly when a student attempts to tamper with any of the alarm's controls, including turning off its power switch or unplugging its power cord.

12 Claims, 9 Drawing Figures

TAMPERPROOF CLASSROOM NOISE ALARM

BACKGROUND OF THE INVENTION

1. Field of the Invention

The present invention relates to the field of audio detectors and audio alarms, and is more particularly directed to a noise alarm used in a classroom to detect and react to noise exceeding a predetermined level and constitutes, in part, certain improvements relating to the invention specified in U.S. Pat. No. 4,346,374 issued to the present applicant on Aug. 24, 1982.

2. Description of the Prior Art

It is desirable for the instruction to maintain an acceptable classroom noise level during a given learning situation, so that both students and teacher can concentrate on the lesson at hand. Too often the teacher must repeat the shopworn phrase, "You're too noisy!" even when the class is highly motivated and well-behaved, since the combined whispers and comments of thirty or so exuberant youngsters can quickly build to an earsplitting crescendo. To objectively and automatically maintain an acceptable classroom noise level, an electronic audio alarm is placed within the classroom to detect and react to any noise which exceeds a given sound level, as predetermined by the instructor. For example, the alarm is adjusted so that associated sounding means are actuated to automatically notify the students when classroom noise exceeds a "whisper" level.

To further reinforce the noise alarm, the device incorporates counting and display means which count and display in digital form the total number of times the alarm has been actuated in response to excessive classroom noise. Usually the instructor will use the resulting "count" to penalize the class for being noisy by translating the count displayed into one minute per count, so the students are dismissed later than normal or receive less recess or P.E. time. Since the alarm device functions independently of the teacher, it can be used to maintain an acceptable classroom noise level when the teacher is not physically present in the classroom, as, for example, during a recess or lunch period.

The classroom noise alarm of U.S. Pat. No. 4,346,374 also incorporates a time delay mechanism to make the alarm more tolerant of occasional noise by inhibiting the sounding means and count display unless noise occurs frequently and within a predetermined time frame. The above device exhibits a minor disadvantage, however, in that the alarm can be enabled or actuated by short duration noise, such as that of a door slam, a book falling to the floor, or a cough. The alarm can also be triggered by loud, continuous noise, such as that of a classroom recess bell.

In attempts to obviate these disadvantages, other educational noise alarm devices have been invented. U.S. Pat. No. 4,416,155 incorporates a capacitor-voltage comparator circuit in which classroom noise exceeding a preset level causes a capacitor to charge to a threshold voltage level. When the voltage threshold is reached, as determined by an associated comparator, an alarm is actuated. Sharp, isolated noises are not long enough in duration to charge the capacitor to a nominal threshold voltage and will, thus, be ignored. Another alarm device, U.S. Pat. No. 4,481,504, incorporates an oscillator circuit which repeatedly enables the alarm device for a brief time every 2.5 seconds in a first selective mode and every 6-7 seconds in a second mode. An associated alarm sounds if classroom noise, in excess of a preselected level, occurs within a brief time frame either in the first or second mode. A third alarm device, U.S. Pat. No. 4,529,973, includes a large filter capacitor in the audio signal rectifier circuit, which causes the alarm to ignore short, non-repetitive noises. None of the above noise alarm devices addresses the "false alarm" problem caused by long duration noise, such as that of a recess bell or even a pencil sharpener.

A major disadvantage of U.S. Pat. No. 4,346,374, other than being unable to ignore short and long duration noise, is that any of several controls on the device are easily accessible to students and can be surreptitiously manipulated to defeat the sounding means, count display, or both. Tampering can easily be accomplished when the instructor is not physically present in the classroom, and possibly even when he is present. It is, therefore, a general object of the present invention to provide a tamperproof classroom noise alarm.

SUMMARY OF THE INVENTION

Accordingly, the primary object of the present invention is to provide a classroom noise alarm which detects noise and which actuates associated sounding means when classroom noise exceeds a predetermined level and when a student attempts to tamper with any control on the alarm, including its power cord. A further object of the present invention is to provide a classroom noise alarm which is not actuated by short duration noise, such as that of a door slam, cough, or falling book, or by persistent, continuous noise, such as that of a classroom recess bell. Additional advantages of the present invention will be apparent from the following description of a preferred embodiment of the invention.

A preferred embodiment of the present invention provides a compact, AC-powered noise alarm which can be used at any location within a school classroom. Once the device is plugged in and turned on, the instructor sets a desired noise trigger level by rotating an indexed "volume level" knob while observing a "monitor" light-emitting diode (LED) which glows when noise, detected by a microphone contained in the front panel of the device, is of sufficient intensity to trigger sounding means of the alarm. Timing circuits within the device allow the alarm circuit to be enabled by the first noise which exceeds a predetermined volume level and which exceeds one second in duration.

In a first, "delay-off" mode, a second classroom noise which occurs within approximately 1-3 seconds of the first noise, and which meets the abovedescribed criteria, actuates the alarm sounding means. In a second, "delayon" mode, additional noise which occurs approximately within 13-17 seconds of a second noise, and which again exceeds one second in duration and a predetermined intensity level, actuates the alarm sounding means. The classroom noise alarm is designed to ignore prolonged, continuous noise, such as a recess bell, as well as short duration noises which can be caused by a door slamming, dropping of a book, or by coughing. When triggered by excessive student talking, sounding means comprising a dual oscillator, amplifier, and speaker produce a 2.5-second two-tone alarm which notifies both instructor and students that excessive noise is being detected.

The noise alarm also provides internal counters and associated 2-digit LED readout, which allow visual monitoring of exactly how many times (1 to 99) the alarm has been triggered. The counters can be reset to zero at any time the instructor so desires, and the noise alarm can be temporarily disabled (switched to "hold"), while still retaining the count display. The noise alarm additionally contains automatic power-up reset means, assuring that internal counters are reset to zero following initial application of power to the device. By requiring that a certain number of counts, as displayed by the LED readout, will result in a given penalty to the class, the instructor reinforces an acceptable classroom noise level which he has determined and which is automatically maintained by the noise alarm device, even if the instructor is not in the classroom.

Since any of the controls, such as "hold," "volume level," "reset," etc., which are contained on the front panel of the alarm device can be manipulated by students to alter the count display and, thus, eliminate a penalty for too much noise, the tamperproof classroom noise alarm contains logic circuitry which initiates and maintains repeated alarm tones and display counts when any control is tampered with. The alarm device also contains a rechargeable battery supply to maintain repeated alarm tones and display counts, in the event a student attempts to disable the device by turning off the power switch or by pulling the power plug. The internal battery can also be used to temporarily power the noise alarm when the instructor wishes to use the device where no AC power outlet is available.

DESCRIPTION OF THE PREFERRED EMBODIMENT

Figure 1:
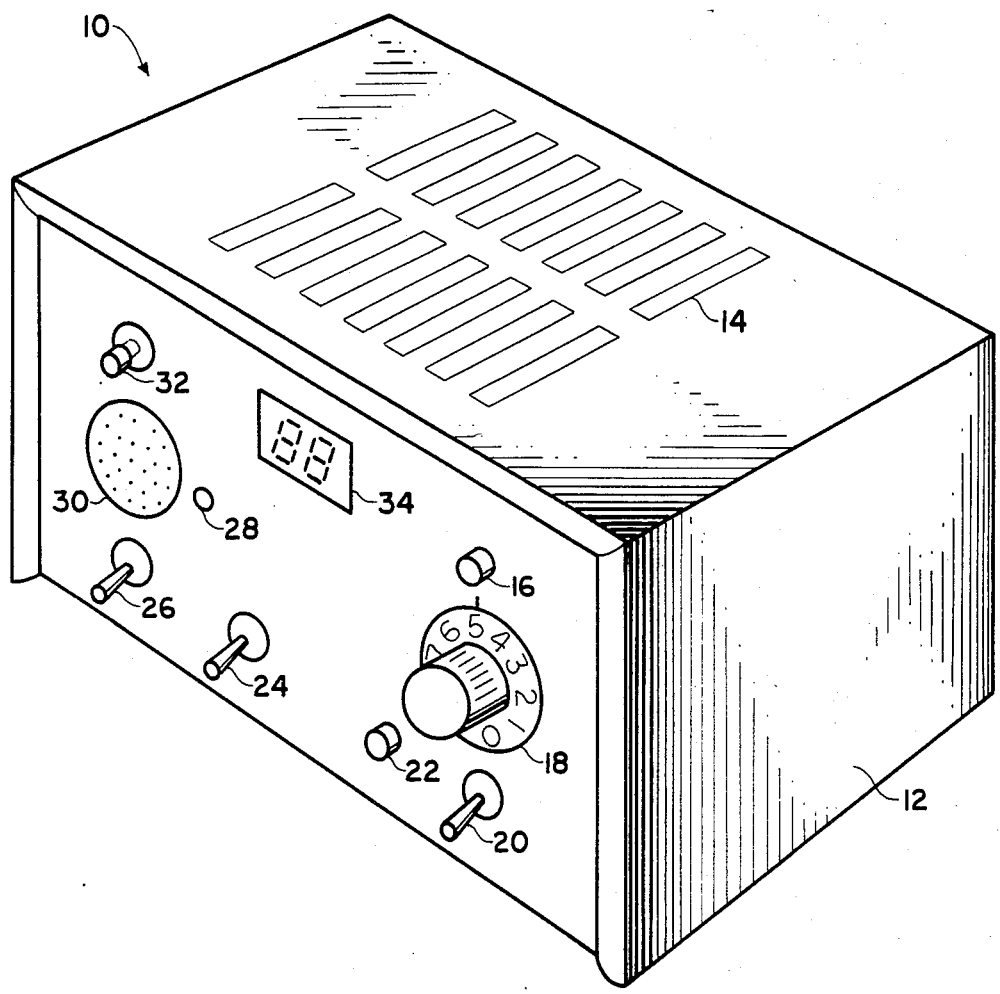
FIG. 1 is a perspective view of the tamperproof classroom noise alarm of the present invention.

Referring to FIG. 1, a tamperproof classroom noise alarm 10 is shown. The alarm is designed to detect and react to noise in excess of a predetermined level and duration which occurs within a school classroom. The exterior of sound alarm 10 consists of a housing 12, a speaker grille 14, a "monitor" LED 16, a "volume level" rotary switch 18, a "hold" switch 20, a "hold" indicator LED 22, a "delay" on/off switch 24, a power switch 26, a phototransistor 28, a microphone 30, a "reset" switch 32, and an LED readout 34. A line cord (not shown) extends from the rear of the housing, allowing the noise alarm to be pugged into any convenient wall outlet. The device is powered when power switch 26 is closed, but the audio alarm and LED readout 34 are disabled for several seconds while an internal power-up reset timer cycles. This prevents invalid alarms and counts due to glitches which occur during initial power-up.

Classroom noise is detected by a microphone 30 and will trigger the alarm, if the noise exceeds one second in duration and if the noise exceeds a predetermined amplitude, as determined by the setting of "volume level" rotary switch 18. If the noise is of sufficient duration and intensity to trigger alarm circuitry, internal sounding means, including a speaker mounted beneath speaker grille 14, produce a loud, two-tone alarm for a period of 2.5 seconds. To aid in desired adjustment of "volume level" switch 18, "monitor" LED 16 is observed while rotating switch 18 to note when the LED glows, since this indicates that classroom noise entering the device is of sufficient intensity to trigger alarm circuitry.

Each time the alarm sounds, LED readout 34 displays a count, beginning with "1" and going as high as "99." If the instructor anticipates a particularly noisy classroom period which he does not wish to monitor with tamperproof noise alarm 10, he may place "hold" switch 20 in an on position. With the "hold" switch on, the alarm is disabled, but still displays any alarm count which has been previously made. An associated "hold" indicator LED 22 is illuminated during the hold mode to remind the instructor that the noise alarm is disabled. If, on the other hand, the instructor wishes to "erase" the count displayed by LED readout 34, he can simply depress "reset" pushbutton switch 32. At this time, internal counters are reset to zero, causing the LED readout to remain at zero until the alarm is again triggered and a new count is recorded.

With "delay" switch 24 in an off position, a first noise which exceeds the above-described criteria enables alarm circuitry, allowing a second noise which occurs approximately 1 to 3 seconds later to trigger the alarm sounding means. With switch 24 in an on (delay) position, the alarm is enabled by a first noise, but the sounding means is not actuated unless additional noise occurs approximately 13–17 seconds later. The delay mode is used by the instructor when he wishes to occasionally remind his students of their excessive noise. When the delay mode is not used, the alarm immediately triggers following a second excessive noise.

On the rear panel of tamperproof classroom noise alarm 10, a lock switch (not shown) is provided so that the instructor can "arm" the alarm device with a key which he retains. When the noise alarm is armed, an internal "tamperproof" circuit is enabled which causes the sounding means and associated LED readout 34 to be repeatedly actuated if any student attempts to reposition any of the controls contained on the front panel, or if the power cord is disconnected. The rear panel of the noise alarm also contains a "slow/trickle" charge switch, which determines the charge rate of an internal rechargeable battery. When the device is armed, the battery automatically powers alarm 10 when power switch 26 is turned off or when the power cord is disconnected from a wall outlet.

A phototransistor 28 is positioned near microphone 30, causing repeated actuation of the alarm sounding means when a student attempts to muffle classroom noise by covering the microphone with his hand, a coat, pillow, etc. When tampered with, the alarm device repeatedly sounds a two-tone alarm at five-second intervals, with one display count accompanying each 5-second interval, until the instructor uses his key to disarm the device. A "low battery" indicator LED (not shown) is also provided on the rear panel of the alarm to inform the instructor when the battery is low and in need of a higher charge rate. Normally the battery is trickle charged during operation of the noise alarm.

Figure 2:
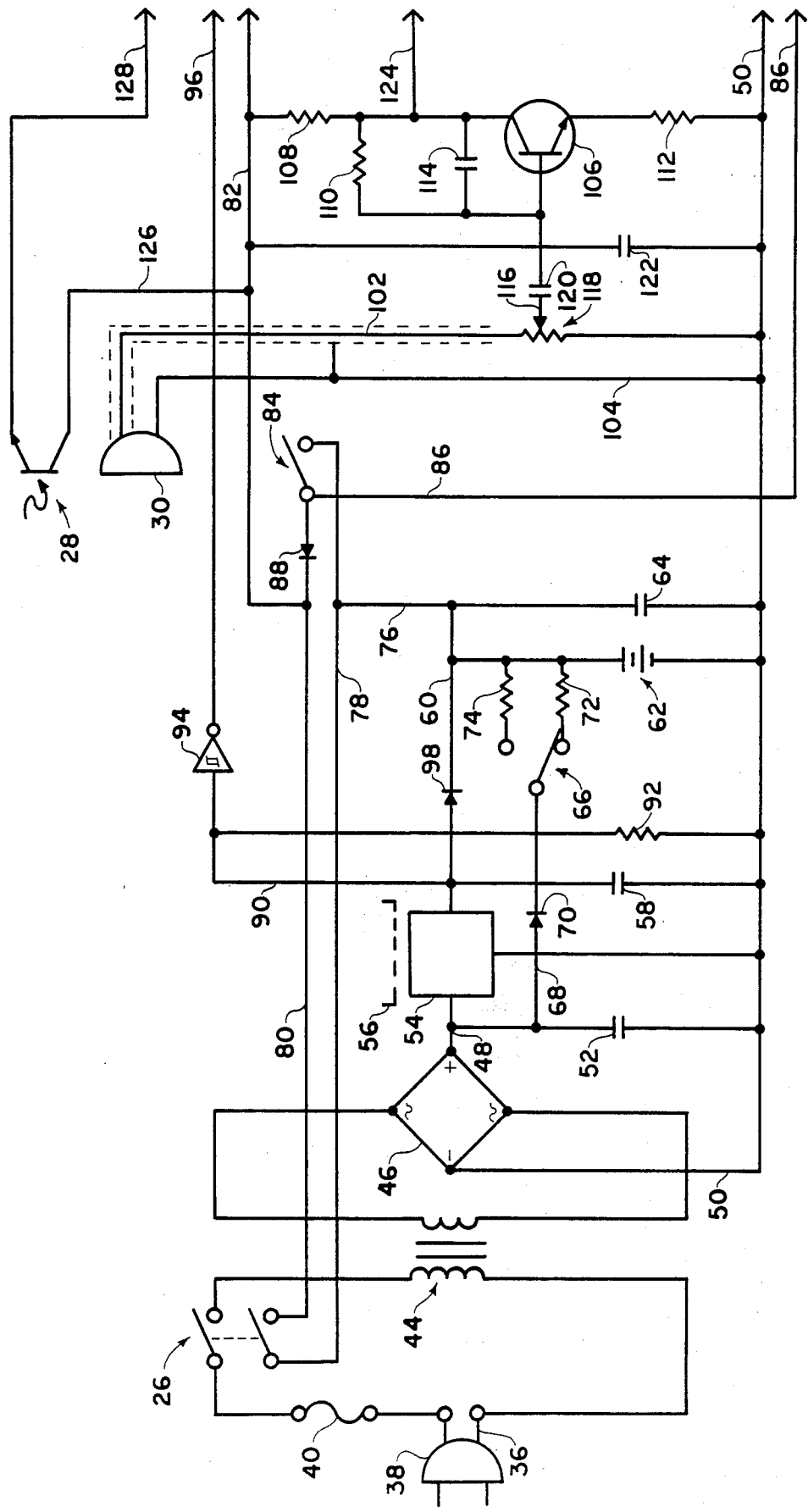
FIG. 2 is a schematic diagram showing the AC power supply, power switch rechargeable battery, charge circuit, charge switch, lock switch, microphone, microphone preamplifier, and phototransistor of the present invention.

Referring next to FIG. 2, an AC power supply, power switch, rechargeable battery, charge circuit, charge switch, lock switch, microphone, microphone preamplifier, and phototransistor of tamperproof classroom noise alarm 10 are shown in a schematic diagram. A line cord 36 and attached plug 38 allow the noise alarm to be connected to an AC power source. One side of line cord 36 is connected, via a ¼ ampere fuse 40 and the first terminals of a DPST power switch 26, to a first terminal of the primary winding of a 120/12.6 VAC step-down transformer 44. The other side of line cord 36 is connected to a second terminal of the primary winding of transformer 44. Terminals of the 12.6 VAC secondary winding of transformer 44 are connected to appropriate AC terminals of a full-wave rectifier 46. Positive direct current appears on line 48; system ground appears on line 50. A large electrolytic capacitor 52 filters the rectified output which is regulated at 8 VDC by a voltage regulator 54 and associated heat sink 56. A small tantalum capacitor 58 is connected between system ground line 50 and +V line 60 to stabilize the 8 VDC regulated output.

A 6.25 VDC battery supply is also provided for the noise alarm by a battery 62 comprising five 1 ampere-hour nickel cadmium cells which are series connected between +V line 60 and grund line 50. Battery 62 provides backup current to the noise alarm in the event of AC power loss, or when the instructor wishes to temporarily use the alarm where no AC source is available. A small tantalum capacitor 64 is connected between line 60 and line 50 to assure smooth automatic changeover when power plug 38 is pulled or when power switch 26 is opened during "tamperproof" alarm operation.

Battery 62 is normally trickle charged when the noise alarm is powered by an AC source. The battery charge circuit consists of a SPDT charge switch 66, line 68, diode 70, and current-limiting resistors 72 and 74. Resistor 72 is selected to provide a charge current to battery 62 of approximately 10 mA at 12 VDC, allowing the battery to be trickle charged when charge switch 66 is in a first position (as shown) and when the noise alarm is normally powered by 120 VAC. Resistor 74 is selected to provide a slow (14–16-hour) charge rate of approximately 100 mA at 12 VDC when charge switch is in a second position. As will be described with reference to FIG. 6, the noise alarm is provided with a "low battery" indicator which informs the instructor when charge switch 66 should be in a second position to fully recharge battery 62. Diode 70 is series connected in line 68 to prevent battery current from reaching the input of regulator 54 when AC power is disrupted or not used.

System +V appearing on line 60 is normally conducted to the noise alarm via lines 76 and 78, the second terminals of power switch 26, and lines 80 and 82. It should be noted that the first and second terminals of power switch 26 simultaneously control both the AC and battery power supplies to the noise alarm in either an open or closed position. A SPST lock switch 84 is parallel connected with the above power supply circuit, allowing battery current to be conducted to the noise alarm via line 78, lock switch 84, and lines 80 and 82 when the alarm is in an armed, "tamperproof" mode, i.e., when lock switch 84 is closed and power switch 42 is open (as when a student attempts to silence the alarm by turning off the alarm device). An "enable" line 86 is connected to the wiper of lock switch 84, and is used to enable tamperproof logic circuitry (FIG. 5) of the noise alarm when the lock switch is closed with a key. Enable line 86 is normally low (logical "0"), but goes high (logical "1") when lock switch 84 is closed, since +V on line 78 is conducted to the switch's wiper and line 86. A diode 88 is inserted between the wiper of lock switch 84 and line 80 to block +V to enable line 86, unless switch 84 is closed.

A voltage "sensor" line 90 is connected to the regulator output on line 60 is sense when AC power is interrupted, either by opening power switch 26 or by disconnection of power plug 38. When the noise alarm is AC powered, the regulated voltage on line 90 is at 8 volts, but a pull-down resistor 92, connected between line 90 and system ground line 50, drives line 90 to a logical "0" when AC power is disrupted. Voltage on line 90 is inverted by a 4584 Schmitt inverter 94 (to add hysteresis, since disrupted voltage of regulator 54 drops rather slowly due to the high capacitance of filter capacitor 52) and appears on line 96 which, in turn, is connected to subsequent "tamperproof" logic. A silicon diode 98 is inserted in line 60 between the battery supply and sensor line 90 to prevent battery voltage from maintaining sensor line 90 at logical "1" even though AC power is disrupted. Although regulator output voltage is 8 VDC, system +V appearing on line 82 is approximately 7.2 V because of the drop of diode 98. When lock switch 84 is closed (tamperproof circuitry enabled) and power switch 42 open, the battery voltage on line 82 is approximately 5.5 volts due to the drop of diode 88.

A low impedance, omni-directional, dynamic microphone 30 is connected, via shielded audio line 102, to the microphone preamplifier circuit of the device. Ground line 104 connects the mircrophone to ground. The gain of the preamplifier, which is comprised of an NPN transistor 106, resistors 108, 110, and 112, and capacitor 114, is determined by the position of wiper 116 of a potentiometer 118. A small capacitor 120 is used to couple the microphone input with the base of preamplifier transistor 106. An additional capacitor 122 is connected between supply lines 82 and 50 to decouple the preamplifier from these lines. The output of the microphone preamplifier appears on line 124.

A silicon NPN phototransistor 28 is positioned next to microphone 30 to detect reduction in light at the microphone surface, which indicates student attempts to muffle sound entering the microphone. The collector of transistor 28 is connected, via line 126, to +V line 82, allowing emitter sensor line 128 to remain high as long as phototransistor 28 is illuminated by ambient room light. Sensor line 128 will be further described with reference to FIG. 3.

Figure 3:
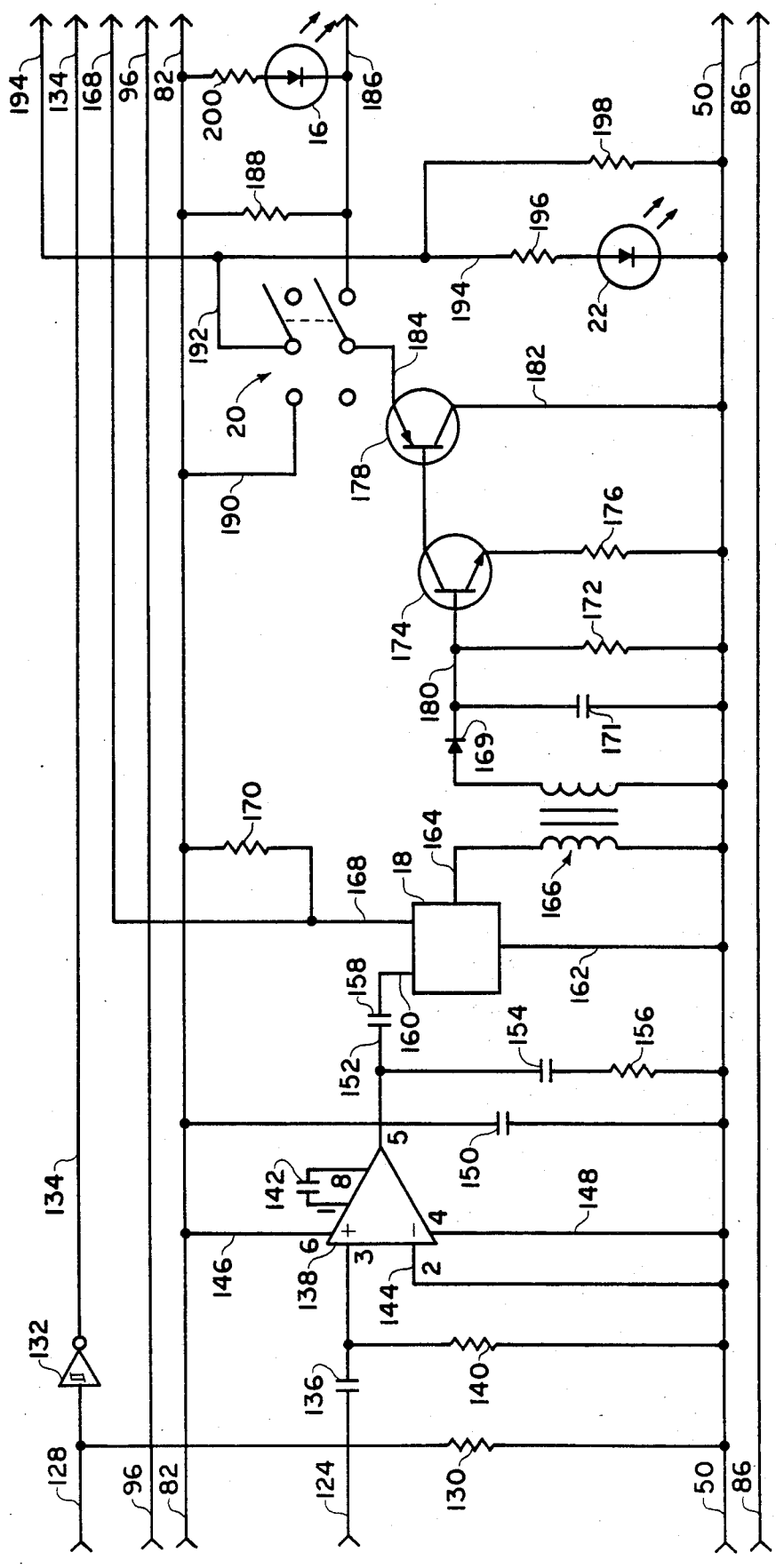
FIG. 3 is a schematic diagram showing a microphone amplifier, "volume level" rotary switch, sound-actuated switch, "hold" switch, "hold" switch indicator LED, and "monitor" LED of the present invention.

Referring now to FIG. 3, a microphone amplifier, "volume level" rotary switch, sound-actuated switch, "hold" switch, "hold" switch indicator LED, and "monitor" LED of the present invention are shown in a schematic diagram. In order to maintain high sensitivity of phototransistor 28 (FIG. 2), so that sensor line 128 remains at logical "1," even in rather dim ambient light, a 150 kilohm pull-down resistor 130 is connected between line 128 and ground line 50. Sensor line 128 is then inverted by a 4584 Schmitt inverter 132, which adds sufficient hysteresis to cause the sensor output to ignore minor fluctuations in ambient light. The inverted phototransistor sensor output appears on line 134.

The microphone preamplifier output on line 124 is coupled, via a small capacitor 136, to the non-inverting input of an LM-386 amplifier 138. Resistor 140 limits the input gain of the amplifier which, in turn, is set at 200 by a capacitor 142. The amplifier's inverting input is shorted to ground via line 144, while lines 146 and 148 supply +V and ground to the circuit. Amplifier 138 is decoupled from its supply lines by a capacitor 150, and the amplifier microphone output appears on line 152. To prevent unwanted RF oscillation, a capacitor 154 and resistor 156 form a series network which is connected between output line 152 and ground line 50. The amplified microphone output on line 152 is then coupled, via a capacitor 158, with "volume level" rotary switch 18. As previously described, rotary switch 18 is used to set the sensitivity of the alarm device, and determines what intensity of noise is necessary in order to trigger alarm circuits.

Since volume level rotary switch 18 is used to determine all noise level settings, preamplifier input potentiometer 118 (FIG. 2) remains in a relatively high gain position, although it can be adjusted to require a higher or lower setting of volume level switch 18 for a given noise level, if this is desired. A non-shorting, 3-pole, 12-position rotary switch 18 is utilized in place of a conventional linear taper potentiometer for volume level adjustment, so that a sensor circuit can be included which senses when the switch position is altered by student tampering. Two of the switch poles are used to provide eleven fixed voltage dividers, allowing eleven volume adjustments from low to high level. The remaining pole is used for a sensor circuit which is normally at ground, but which briefly goes high each time the switch is rotated to a new position.

The audio input terminal of rotary switch 18 is connected to line 160; the ground terminal is connected, via line 162, to ground line 50. The adjustable volume level output appears on line 164, which is connected to the primary winding of an audio transformer 166. A sensor line 168 is connected to rotary switch 18 and is driven high by a pull-up resistor 170 each time the switch position is changed. The control knob for rotary switch 18 is indexed from "0" to "10" (with position "11" being blank) and referenced with a line inscribed on the front housing panel (FIG. 1), allowing the instructor to easily associate various classroom noise levels with whether or not the noise alarm is actuated. Once various noise levels are determined, the knob index numbers provide a handy visual reference, allowing quite accurate noise level adjustment. A schematic diagram showing detail of rotary switch 18 will be subsequently described with reference to FIG. 8.

To convert the amplified microphone output from analog to digital control signals, the noise alarm contains a sound-actuated switch comprising an audio transformer 166, a diode 169, a capacitor 171, a resistor 172, an NPN transistor 174, a resistor 176, and a PNP transistor 178. Step-up audio transformer 166 is included in the circuit to slightly boost the AC audio voltage appearing on the secondary transformer winding at diode 169. the lower terminals of the transformer are connected to system ground line 50. Silicon diode 169 rectifies the audio voltage which, in turn, is filtered by capacitor 171, thus producing a positive digital voltage on line 180 in response to classroom noise which is detected by microphone 30 (FIG. 2).

Line 180 is connected to the base of NPN transistor 174, causing the transistor to conduct when noise of sufficient intensity is detected. A pull-down resistor 172 is connected between line 180 and ground to provide a quiescent logical "0" on line 180 and prevent premature and false conduction of transistor 174. The emitter of transistor 174 is connected to ground via a current-limiting resistor 176, while the collector is directly connected to the base of a PNP transistor 178. The collector of transistor 178 is connected, via line 182, to ground, thus providing a logical "0" output at its emitter and line 184 when noise detected by microphone 30 is of sufficient intensity to be passed by volume level rotary switch 18. Transistor 174 inverts the rectified audio signal, and transistor 178 further amplifies and switches it. Thus, the above-described sound-actuated switch converts any valid noise signal appearing on line 164 to a logical "0" noise-generated logical control signal which appears on line 184.

At this point, the first terminals of a DPDT "hold" switch 20 control whether or not the sound-actuated switch output is conducted to associated timing circuits. When the first terminals of hold switch 20 are closed, any logical "0" noise-generated logical control signal appears on line 186. When the first terminals of hold switch 20 are open, line 186 remains at logical "1," since a pull-up resistor 188 is connected between line 186 and +V line 82. To remind the instructor of the hold switch position, a hold switch indicator LED 22 is connected to +V via the second terminals of hold switch 20. When the first terminals of the hold switch are open (when the alarm device is on "hold"), hold indicator LED 22 is illuminated, since it receives +V via lines 82 and 190, the second terminals of hold switch 20, lines 192 and 194, and a current limiting resistor 196. Resistor 196 is selected to provide approximately 10 mA to LED 22. Line 194 also functions as a sensor line which is normally held low by a pull-down resistor 198, but is driven high by line 192 when a student attempts to tamper with the noise alarm by switching it to "hold."

A "monitor" LED 16 has its cathode connected to sound-actuated switch output line 186 and its anode connected to +V via a current limiting resistor 200. With this arrangement, any noise which is of sufficient intensity to cause the sound-actuated switch to output a logical "0" voltage will, in turn, cause monitor LED 16 to glow. Thus, the instructor is aided in setting volume level switch 18 by observing LED 16 as the indexed rotary switch knob is rotated. If the instructor wants the sound alarm to be actuated at any given noise level, he simply rotates the knob of switch 18 until monitor LED 16 begins to glow in response to the classroom noise being detected. As previously described, various noise levels can be quickly established and referenced by noting the position of the various index numbers on the switch knob.

Monitor LED 16 also provides a visual warning to students when their noise level is high enough to be detected by the alarm device, since the LED flashes in response to noise being detected. If the students immediately become quiet following a first excessive noise, the sounding means of the noise alarm will not be actuated. If, however, students continue to make excessive noise, the audible alarm sounds and monitor LED 16 glows steadily at full intensity for the duration of the alarm, since the sound-actuated switch output on line 186 is driven to a saturated low level by sound of the audible alarm. Thus, LED 16 serves as a noise monitor and alarm indicating means.

Figure 4:
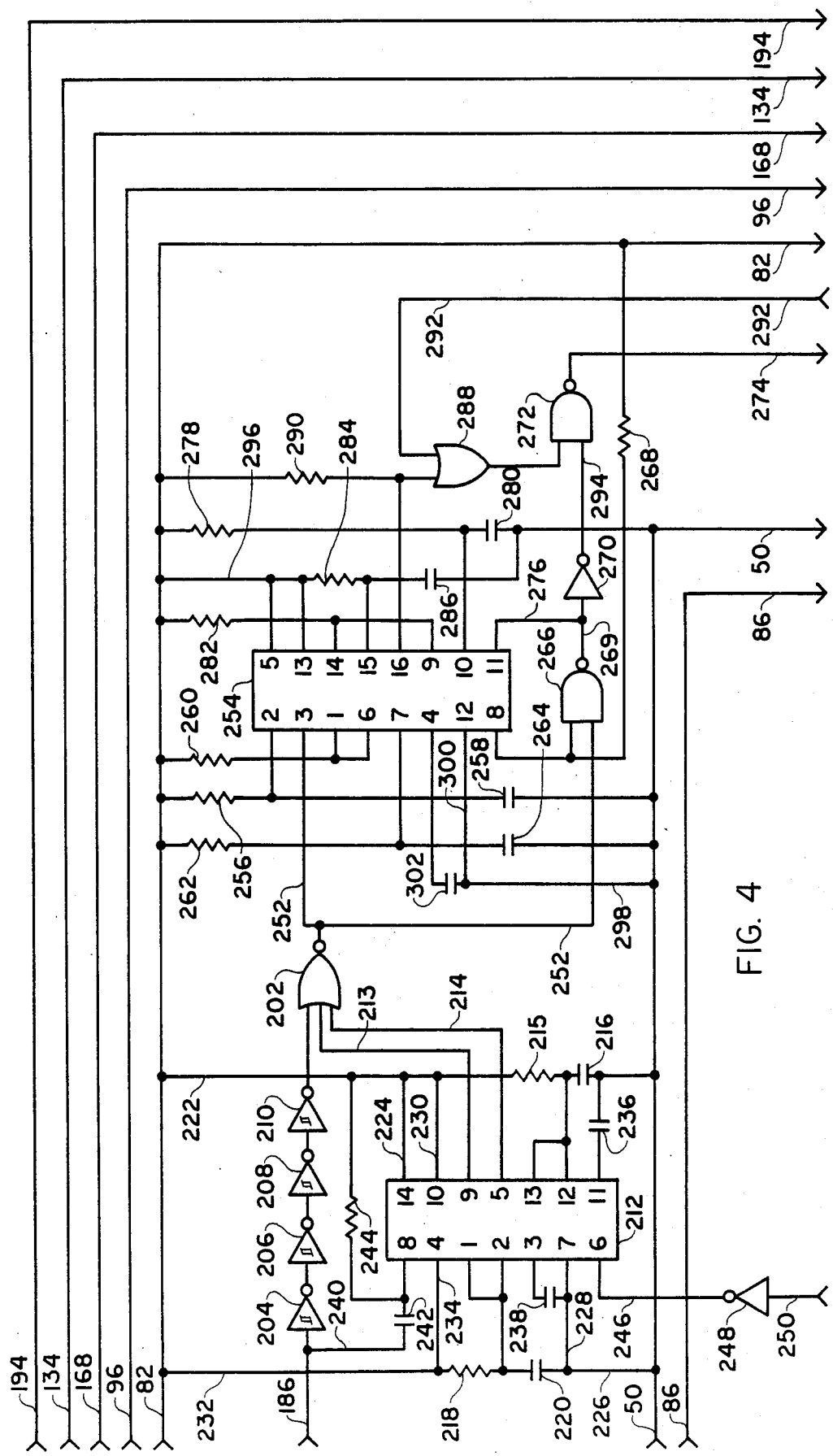
FIG. 4 is a schematic diagram showing a 1-second "noise inhibit" timer, 3.5-second "alarm inhibit" timer, 1-second "enable" timer, 2-second "window" timer, 13-second "delay" timer, 4-second "window" timer, and associated logic gates of the present invention.

Referring next to FIG. 4, a 1-second noise inhibit timer, 3.5-second "alarm inhibit" timer, 1-second "enable" timer, 2-second "window" timer, 13-second "delay" timer, 4-second "window" timer, and associated logic gates of the present invention are shown in a schematic diagram. Sound-actuated switch output line 186 is gated by a 4025 3-input NOR gate 202, which functions as a negative logic NAND gate. To add propagation delay, line 186 is connected, via 4584 Schmitt inverters 204, 206, 208, and 210, to a first input of NOR gate 202. A 556 dual timer 212 provides a first, 1-second "noise inhibit" timer, which has its output at pin 9 connected, via line 213, to a second input of gate 202, and a second, 3.5-second "alarm inhibit" timer which has its output at pin 5 connected, via line 214, to a third input of gate 202. A timing resistor 215 and timing capacitor 216 are selected to provide a 1-second output at pin 9 of the noise inhibit timer; a timing resistor 218 and timing capacitor 220 are selected to yield a 3.5-second output at pin 5 of the alarm inhibit timer. Dual timer 212 receives +V via lines 82, 222, 224, and pin 14 and ground via lines 50, 226, 228, and pin 7. Timer resets at pins 10 and 4 are tied high via lines 82, 222, and 230 and lines 82, 232, and 234, respectively. Control voltage inputs at pins 11 and 3 are bypassed to ground via capacitors 236 and 238.

With the above-described arrangement, any logical "0" noise-generated logical control signal appearing on sound-actuated switch output line 186 triggers the 1-second noise inhibit timer via line 240 and capacitor 242. A pull-up resistor 244 maintains a quiescent logical "1" on trigger input pin 8. When the noise inhibit timer is triggered, its associated output at pin 9 remains high for one second, thus, blocking transmission of any noise-generated logical control signal through NOR gate 202, unless the control signal exceeds one second in duration. As previously mentioned, Schmitt inverters 204, 206, 208, and 210 provide enough propagation delay and hysteresis between line 186 and the first input of NOR gate 202 to allow the 1-second noise inhibit timer to control the gate at its second input. Thus, short duration noise signals, such as those caused by a door slam or a book falling to the floor, will not be transmitted by NOR gate 202 and will not actuate subsequent alarm circuitry. Longer duration signals, such as those caused by student talking will, however, be transmitted by gate 202.

The trigger of 3.5-second alarm inhibit timer at pin 6 is connected, via line 246, a 4069 inverter 248, and line 250, to the output of a 2.5-second "alarm" timer which will later be described with reference to FIG. 5. Whenever the sounding means of the noise alarm is actuated by a 2.5-second alarm timer, the timer's positive output is inverted and used to trigger the above 3.5-second alarm inhibit timer which, in turn, provides a 3.5-second positive output on line 214 to a third input of NOR gate 202. NOR gate 202 prevents transmission of noise signals for 3.5 seconds while the alarm is sounding, thus, preventing the noise alarm from reacting to its own 2.5-second sounding means. In summary, logical "0" noise-generated logical control signals on sound-actuated switch output line 186 are transmitted by NOR gate 202 only when both the 1-second noise inhibit timer and the 3.5-second alarm inhibit timer are quiescent (at a logical "0" voltage level). With this arrangement, alarm cicuitry is not actuated by control signals of less than one second in duration, or by noise of the alarm's own sounding means.

Valid noise-generated logical control signals which are transmitted by NOR gate 202 are at logical "1" and appear on line 252 which is connected to the trigger of a first timer of a 558 quad timer 254 at pin 3. This first timer functions as a 1-second "enable" timer which provides a 1-second positive output at pin 1 in response to a negative-going edge of the noise signal. Since the output of NOR gate 202 is normally low until a positive noise signal is transmitted, the 1-second enable timer is triggered by the trailing edge of the noise signal, i.e., when the noise-generated logical control signal ceases and drops to logical "0." Unlike the 555 and 556 timers, the 558 trigger signal need not be returned to a positive level before the end of the timing cycle, thus, obviating the need for capacitor trigger coupling. Also, unlike the 555 and 556 timers, the 558 will only sink current at its outputs, thereby requiring that pull-up resistors be connected to each of the four outputs to provide logical "1" timing outputs.

A timing resistor 256 and capacitor 258 are selected to provide a onesecond output for the 1-second enable timer. The timer output at pin 1 is connected to the trigger (pin 6) of a second, 2-second "window" timer and to a pull-up resistor 260, causing the 2-second window timer to be sequentially triggered when the enable timer completes its 1-second timing cycle. A timing resistor 262 and capacitor 264 are selected to provide a two-second output for the 2-second window timer. The 2-second timer output at pin 8 is connected to a first input of a 4011 2-input NAND gate 266 and to a pull-up resistor 268. A second input of NAND gate 266 is connected to line 252, allowing any valid logical "1" noise signal on line 252 to be transmitted by gate 266 to line 269 when the first input of gate 266 is positive during the 2-second timing cycle of its associated window timer.

With the above arrangement, a valid first noise-generated logical control signal triggers the 1-second enable timer which, in turn, sequentially triggers the 2-second window timer. A second valid noise signal (one that exceeds 1 second in duration and a predetermined intensity) must follow the first noise signal by 1 to 3 seconds, in order to be transmitted by NAND gate 266 during its 2-second "window." If "delay" switch 24 (FIG. 1) is "off," a second noise signal appearing on line 269 is inverted by a 4069 inverter 270 and transmitted by the first input of a 4011 2-input NAND gate 272 to line 274.

Any valid noise signal appearing on line 269 (which, at this point, is at logical "0") is also conducted on line 276 to the trigger (pin 11) of a third, 13-second "delay" timer which provides a 13-second delay before a noise signal can be transmitted by NAND gate 272 when delay switch 24 is "on." A timing resistor 278 and capacitor 280 are selected to provide a thirteen-second output for the 13-second delay timer. The timer output at pin 9 is connected to the trigger (pin 14) of a fourth, 4-second "window" timer and to a pull-up resistor 282, causing the 4-second window timer to be sequentially triggered when the 13-second delay timer completes its timing cycle. A timing resistor 284 and capacitor 286 are selected to provide a four-second output for the 4-second window timer. The 4-second timer output at pin 16 is connected to a first input of a 4071 2-input OR gate 288 and to a pull-up resistor 290. The second input of OR gate 288 is connected to line 292 which, in turn, is connected to the wiper terminal of delay switch 24 (FIG. 5). When delay switch 24 is "on," line 292 is grounded, allowing the 4-second window timer to take control of OR gate 288 by conducting a logical "1" on the gate's first input during its timing cycle. Thus, the second input of NAND gate 272 will be positive for four seconds following a 13-second delay which, in turn, allows positive noise signals on line 294 to be transmitted via the first input of the gate to line 274.

When delay switch 24 is "off," line 292 is positive, thus, making the second input of NAND 272 also positive, even though the 4-second window timer is quiescent (logical "0"). In the "delay off" mode, any valid noise signal which occurs during the previous described 2-second window will be transmitted by NAND gate 272 to line 274. In summary: with delay switch 24 "off," a first noise-generated logical control signal enables alarm circuitry by creating a 2-second "window" which immediately transmits a second noise signal occuring during the 2-second window; with the delay switch "on," a first noise signal enables alarm circuitry by creating a 2-second "window," which allows a second noise signal occuring during the 2-second window to trigger a 13-second delay which, in turn, creates a 4-second "window," allowing subsequent noise signals occuring during the 4-second window to be immediately transmitted. The waveforms of the above timers will be later described with reference to FIG. 9.

Quad timer 254 receives +V via lines 82, and 296, and pin 5 and ground via lines 50, 298, and 300 and pin 12. The timer reset at pin 13 is tied high via line 296, and the control voltage input at pin 4 is bypassed to ground via a capacitor 302. It should be noted that the first, 1-second enable timer of quad timer 254 can be triggered only after a noise signal ceases (by the trailing, negative edge). Thus, a long duration noise, such as that of a recess bell, will enable the alarm circuitry, but not cause actuation of the sounding means. A second or subsequent noise must occur following a recess bell to trigger the audible alarm. If a 555 or 556 timer were used in place of the 558, this same feature can be retained by inserting an inverter in line 252 between the NOR gate output and the timer trigger, and by not capacitor coupling the timer's trigger. Without capacitor coupling, a logical "0" trigger signal which is longer in duration than the timing cycle (1 second, in this case) will not allow the timer output to fall until the trigger signal returns to logical "1." Thus, the output signal follows the trigger signal when no trigger capacitor is used. When using 555 or 556 timers, a negative-edge detector would, of course, be needed to sequentially trigger a second, 2-second "window" timer by the falling edge of the 1-second "enable" timer.

Figure 5:
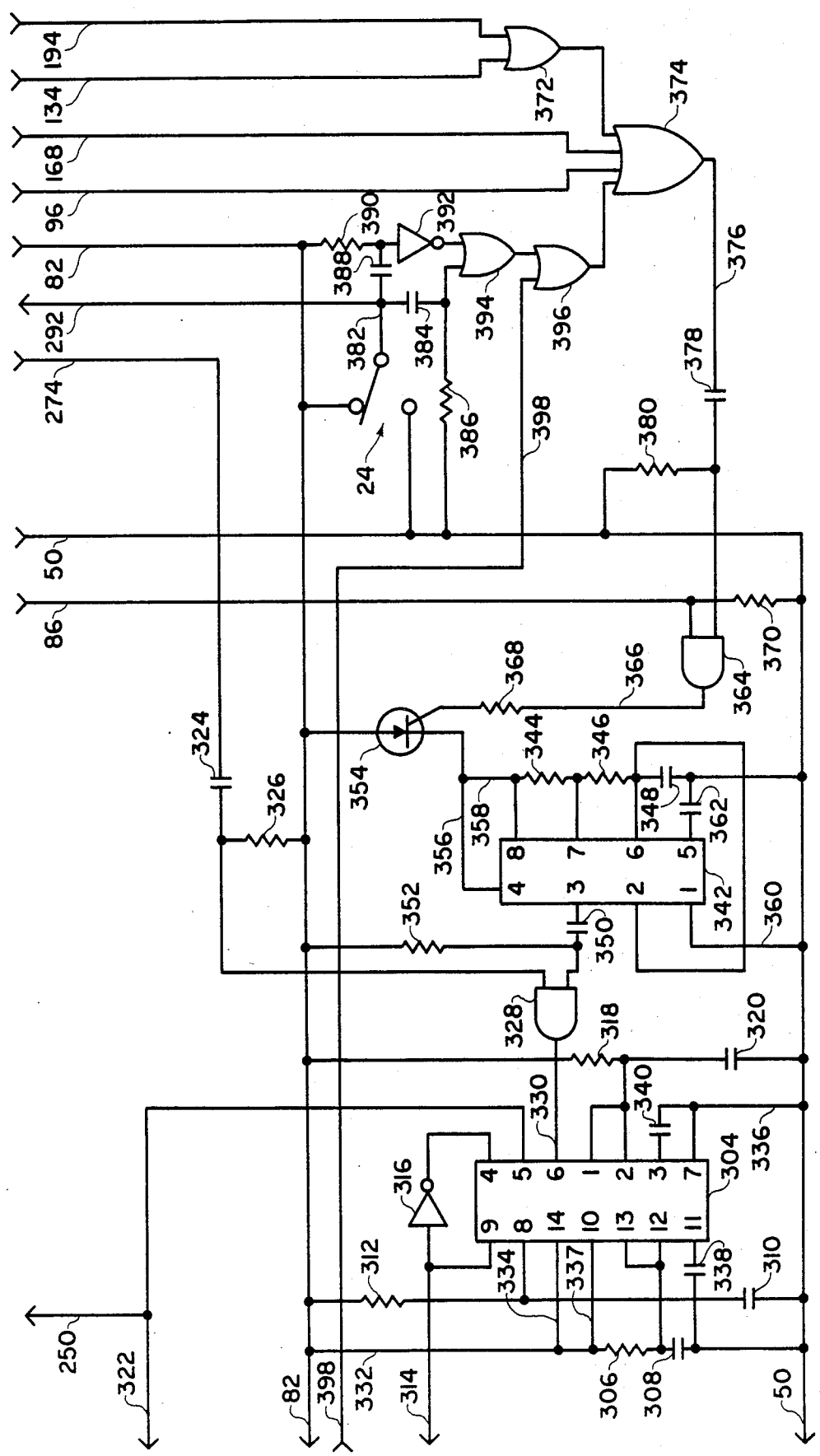
FIG. 5 is a schematic diagram showing a 17-second "power-up reset" timer, 2.5-second "alarm" timer, alarm trigger oscillator, silicon controlled rectifier, "delay" on/off switch, and associated "tamperproof" logic gates of the present invention.

Referring now to FIG. 5, a 17-second "power-up reset" timer, 2.5-second "alarm" timer, alarm trigger oscillator, silicon controlled rectifier, "delay on/off" switch, and associated "tamperproof" logic gates of the present invention are shwon in a schematic diagram. A first timer of a 556 dual timer 304 functions as a 17-second "power-up reset" timer, while a second timer functions as a 2.5-second "alarm" timer. A timing resistor 306 and capacitor 308 are selected to provide a 17-second positive output on pin 9 when power is initially applied to the noise alarm device. The reset timer trigger (pin 8) is connected to ground line 50 via a capacitor 310 and to +V line 82 via a pull-up resistor 312, causing the timer to be triggered each time power control switch 26 (FIG. 2) is closed. The resulting 17-second logical "1" reset pulse is conducted on line 314 to the reset pins of digital counters, which will be later described with reference to FIG. 6, and, via a 4069 inverter 316, to the reset terminal (pin 4) of a 2.5-second "alarm" timer. With this arrangement, both the digital counters and alarm timer are disabled for 17 seconds during power-up of the noise alarm to prevent false counts and alarms due to power-up glitches.

A timing resistor 318 and capacitor 320 are selected to provide a 2.5-second positive output on pin 5 and lines 322 and 250 of the alarm timer which, in turn, is used to clock digital counters, bias an alarm driver transistor (FIG. 6), and to trigger a 3.5-second alarm inhibit timer (FIG. 4) in response to any valid noise signal. Logical "0" noise-generated logical control signals are conducted on line 274, via a negative-edge detector comprising a capacitor 324 and pull-up resistor 326, to a first input of a 4081 2-input AND gate 328, which functions as a negative logic OR. Any noise signal will then appear on line 330, which is connected to the trigger (pin 6) of the 2.5-second alarm timer, causing the timer to be triggered. Dual timer 304 receives +V via lines 82, 332, 334, and pin 14, and ground via lines 50 and 336 and pin 7. The reset (pin 10) of the 17-second power-up reset timer is tied high via line 337; both timers have their control voltage inputs bypassed to ground via capacitors 338 and 340.

A 555 timer 342 is configured in an astable (oscillator) mode to provide an alarm trigger oscillator which is used to repeatedly trigger the above-described 2.5-second alarm timer every five seconds, in the event students tamper with the noise alarm. Timing resistors 344 and 346 and timing capacitor 348 are chosen to provide a 0.2 Hz (5 seconds per cycle) frequency which appears at pin 3 and is conducted, via a negative-edge detector comprising a capacitor 350 and pull-up resistor 352, to a second input of AND gate 328. When oscillator 342 is powered, a brief logical "0" pulse is transmitted by gate 328 and appears on line 330 once every five seconds, causing the 2.5-second alarm timer to be triggered. Pull-up resistor 352 maintains the second input of gate 328 at a quiescent logical "1" when the oscillator is not powered. Alarm trigger oscillator 342 is powered via +V line 82, a silicon controlled rectifier (SCR) 354, lines 356, 358 and pin 8. Ground is provided on lines 50, 360, and pin 1. Reset pin 4 is tied high via line 356, and the control voltage input at pin 5 is bypassed to ground via a capacitor 362.

As previously described, the purpose of alarm trigger oscillator 342 is to repeatedly trigger the alarm timer of dual timer 304 whenever associated "tamperproof" logic gates are actuated by a student attempting to disable the alarm sounding or counting means by resetting any of the controls contained on the front panel of the device, or by simply pulling the power plug. When the instructor wishes to arm "tamperproof" circuitry, a key is used to close a lock switch 84 (FIG. 2), which, in turn, drives enable line 86 high. Enable line 86 is connected to a first input of a 4081 2-input AND gate 364, causing any positive tamper-generated logical control signal on the gate's second input to be conducted, via line 366 and a current-limiting resistor 368, to the gate of SCR 354. When lock switch 84 is open, enable line 86 is held low by a pull-down resistor 370, causing AND gate 364 to be disabled and, thus, allowing control setting changes without triggering SCR 354.

As previously described, sensor line 134 (which begins as line 128) is connected to phototransistor 28 (FIG. 2), and sensor line 194 is connected to hold switch 20 (FIG. 3). These lines are, in turn, connected to the first and second inputs of a 4071 2-input OR gate 372, the output of which is connected to a first input of a 4072 4-input OR gate 374. The sensor lines are normally low, but are driven high when tampering occurs. Any logical "1" voltage on sensor line 134 or 194 is transmitted by gates 372 and 374 to line 376 which is connected, via a positive-edge detector comprising a capacitor 378 and pull-down resistor 380, to a second input of AND gate 364. Gate 364, in turn, transmits a brief, positive, tamper-generated logical control signal of the edge detector, causing SCR 354 to conduct and power trigger oscillator 342.

Sensor line 96 (which begins as line 90), which is connected to the +V output of voltage regulator 54 (FIG. 2), and sensor line 168, which is connected to volume level rotary switch 18 (FIG. 3), are connected to the second and third inputs of OR gate 374, again causing SCR 354 to conduct when either line is driven high by tampering. The wiper terminal of "delay on/off" switch 24 is connected, via line 382 and a positive-edge detector, comprising a capacitor 384 and pull-down resistor 386, and a negative-edge detector, comprising a capacitor 388, a pull-up resistor 390, and a 4069 inverter 392, to the first and second inputs of a 4071 2-input OR gate 394. With this arrangement, when delay switch 24 is toggled to "off" (as shown), line 382 goes positive, causing a brief positive pulse to be generated by the positive-edge detector which, in turn, is transmitted by gate 394 to a first input of a 4071 2-input OR gate 396. Since the output of gate 396 is connected to a fourth input of OR gate 374, SCR 354 is also triggered into conduction when delay switch 24 is turned "off."

When line 382 is made negative by turning delay switch 24 "on," a brief negative pulse generated by the associated negative-edge detector is inverted and again transmitted to the gate of SCR 354, causing it to conduct and, in turn, power trigger oscillator 342. A last sensor line 398 connects a second input of OR gate 396 with the output terminal of a reset switch 32 (FIG. 6), again triggering the SCR when line 398 is driven high as reset switch 32 is momentarily closed. In summary, SCR 354 is triggered by a tamper-generated logical control signal, causing sounding means of the noise alarm to be repeatedly actuated, when: (1) power cord 36 is unplugged; (2) power switch 26 is turned off; (3) reset switch 32 is depressed; (4) hold switch 20 is turned on; (5) volume level rotary switch 18 is rotated to a new position; (6) microphone 30 is covered; (7) delay switch 24 is turned on; and (8) delay switch 24 is turned off. To stop the audible alarm from repeatedly sounding in response to any of the above conditions, a key must be used to open lock switch 84, and power switch 26 must be turned off (if a student has not already done so). At this point, anode current is cut off to SCR 354, as well as current to the remainder of the noise alarm circuit.

Figure 6:
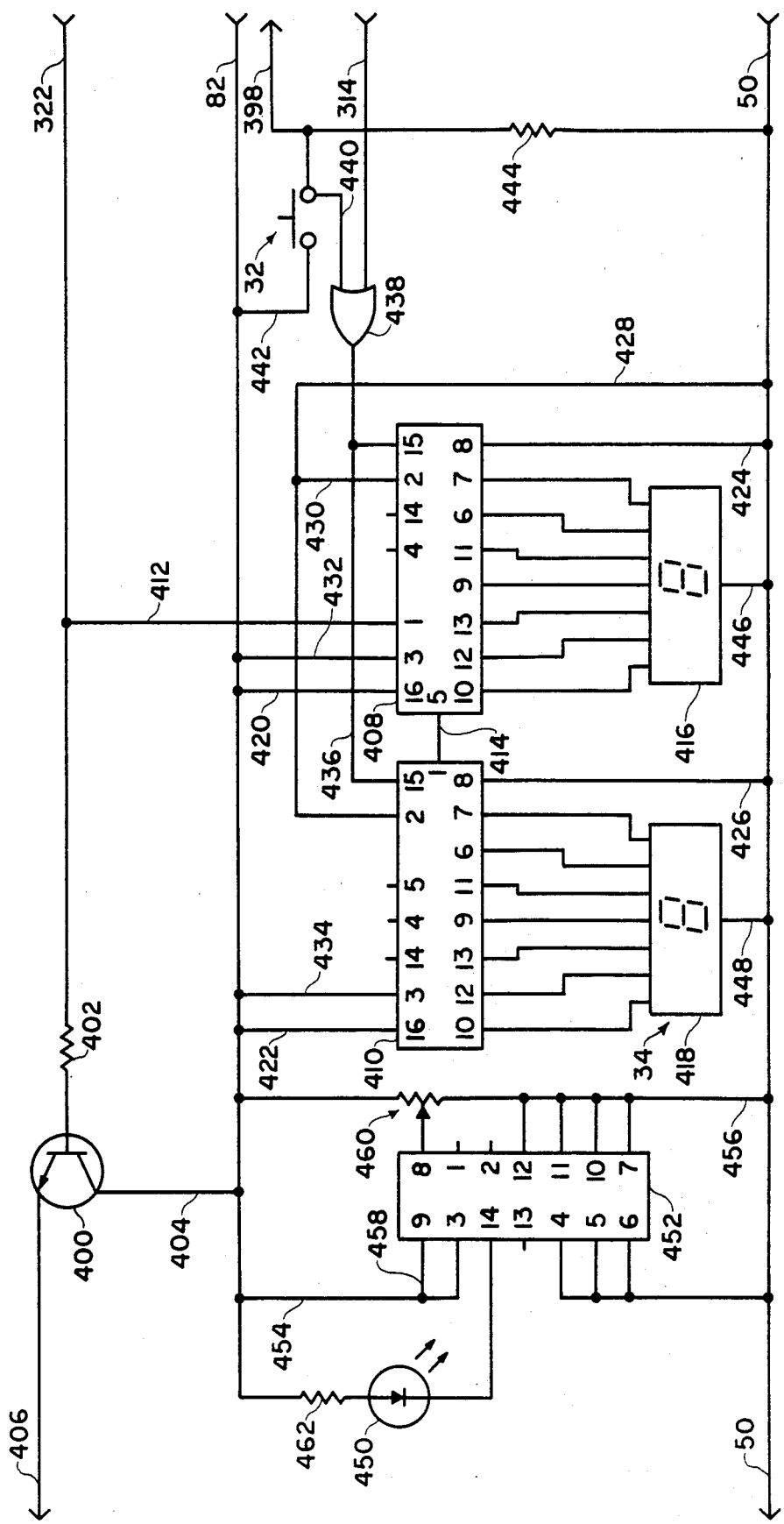
FIG. 6 is a schematic diagram showing a voltage comparator, "low battery indicator LED, alarm driver transistor, digital counters, LED readout, and "reset" switch of the present invention.

Referring next to FIG. 6, a voltage comparator, "low battery" indicator LED, alarm driver transistor, digital counters, LED readout, and "reset" switch of the present invention are shown in a schematic diagram. As previously described, a 2.5-second logical "1" output of the alarm timer appears on line 322 in response to any valid noise-generated logical control signal or to repeated triggering by alarm trigger oscillator 342 (FIG. 5). This 2.5-second positive output is used to bias an NPN alarm driver transistor 400 via a current-limiting resistor 402. The collector of transistor 400 is connected, via line 404, to +V line 82, allowing emitter line 406 to conduct +V for 2.5 seconds in response to detected noise signals and to triggering by oscillator 342. Line 406 is used to power audible sounding means of the noise alarm and will be later described with reference to FIG. 7.

To count the number of times alarm sounding means are actuated, two 4026 decade counters 408 and 410 are cascaded. Line 322 is connected, via line 412, to the clock input (pin 1) of a first (units) decade counter 408. The divide-by-10 output (pin 5) of the counter is connected, via line 414, to the clock input (pin 1) of a second (tens) decade counter 410, allowing the cascaded counters to count from "1" to "99" and display the decoded count on two associated common cathode, 7-segment LED's 416 and 418. LED's 416 and 418 comprise LED readout 34, as shown in FIG. 1.

The counters receive +V via lines 82, 420, 422, and pin 16. Ground is supplied via lines 50, 424, 426, and pin 8. Clock enable inputs at pin 2 are held low via lines 50, 428, and 430; display enable inputs at pin 3 are tied high via lines 82, 432, and 434. Reset inputs at pin 15 are normally held low by line 436 which is connected to the output of a 4071 2-input OR gate 438. The first input of gate 438 is connected, via line 440, to the output of a normally-open, push-button "reset" switch 32, allowing the counters to be reset to zero when switch 32 is momentarily closed. The input of switch 32 is connected, via line 442, to +V line 82, causing line 436 to go high during reset. Sensor line 398, which was previously described with reference to FIG. 5, is also connected to the output of switch 32, causing line 398 to go positive each time reset push-button switch 32 is depressed. A pull-down resistor 444 maintains a quiescent logical "0" on sensor line 398 and gate input line 440. A second input of OR gate 438 is connected to line 314 which, as described with reference to FIG. 5, conducts the output of a 17-second "power-up reset" timer. During power-up (when power switch 26 is initially turned on), the reset timer drives line 314 and associated output line 436 high, thus resetting counters 408 and 410 for 17 seconds to prevent false counts. It should be noted that the instructor can reset the counters and associated LED readout to zero at any time he chooses by momentarily depressing reset switch 32.

Since the counters contain internal decoder/driver outputs, input terminals of LED's 416 and 418 are directly connected to the counters. Because the CMOS counters provide current-limiting output stages, no current-limiting resistors are needed between driver outputs and LED inputs. The LED's are grounded via line 50 and lines 446 and 448 and provide a two-digit readout which displays the total number of times the sounding means of the noise alarm are actuated. Since a logical "1" voltage on line 322 actuates the alarm sounding means, and, since the counter clock inputs are positive-edge responding, LED readout 34 (FIG. 1) is immediately updated each time the audible sounding means are actuated. Since counters 408 and 410 are not zero-blanked, LED readout 34 will read "00" when the noise alarm is initially turned on, thus providing the instructor with a visual "power on" indicator.

A "low battery" indicator LED 450 is provided on the rear panel of the noise alarm to alert the instructor when battery 62 (FIG. 2) drops below a preset level and is in need of recharging at a "slow" (100 mA) rate, rather than at a "trickle" (10 mA) rate. The LED is controlled by a 339 linear quad voltage comparator 452. The comparator receives +V via lines 82, 454, and pin 3. Ground is provided via lines 50, 456, and pin 12. One of the four noninverting comparator inputs (pin 9) is used as a sample voltage input, and is connected to +V via lines 458, 454, and 82. The associated inverting input (pin 8) is used as a reference voltage input, and is connected to the wiper of a trimmer potentiometer 460. The resistive element of potentiometer 460 is connected between +V and ground, allowing the input threshold trip voltage (reference voltage) to be set to a predetermined level. Remaining unused comparator inputs are grounded.

Since battery 62 is, in this example, a nominal 6.25 volts, potentiometer 460 is adjusted so that the output of the active comparator (pin 14) drops to a logical "0" voltage level when the sample battery voltage on pin 9 is at 6.0 volts or less. At this voltage, the battery needs to be charged at a "slow," 100 mA rate. The comparator output on pin 14 is connected to the cathode of low battery indicator LED 450; the LED anode is connected to +V via a current-limiting resistor 462 to limit current drain to about 10 mA when the LED is illuminated in response to a low battery condition.

Figure 8:
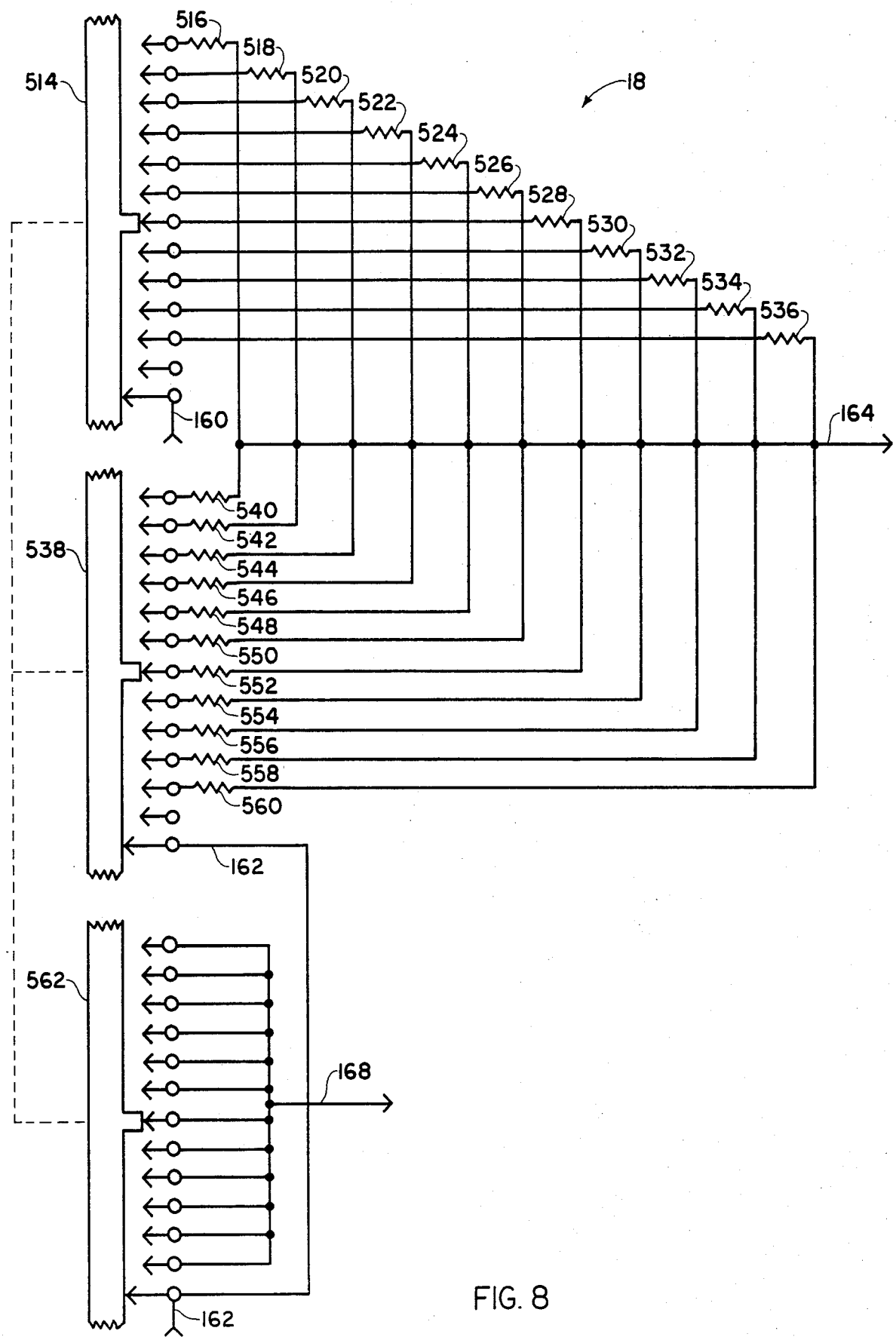
FIG. 8 is a schematic diagram showing detail of the "volume level" rotary switch of the present invention.

Since the noise alarm is normally powered by 120 VAC, power plug 38 (FIG. 2) must be disconnected from its wall outlet, and power switch 26 must be closed when observing LED 450 to determine the battery condition. The LED will, of course, briefly flash when power switch 26 is opened or closed, but the battery is not charged at a slow, 100 mA rate unless LED 450 is constantly illuminated. LED 450 will glow when power switch 26 is open and lock switch 84 is closed, since the additional voltage drop across diode 88 (FIG. 2) causes battery voltage to drop below 6 volts, but this condition does not indicate a low battery condition. It should be noted that the noise alarm can be maintained in a "charge-only" mode by hold switch 20 (FIG. 3), or by rotating volume level rotary switch 18 to its twelfth (blank) position (FIG. 8).

Figure 7:
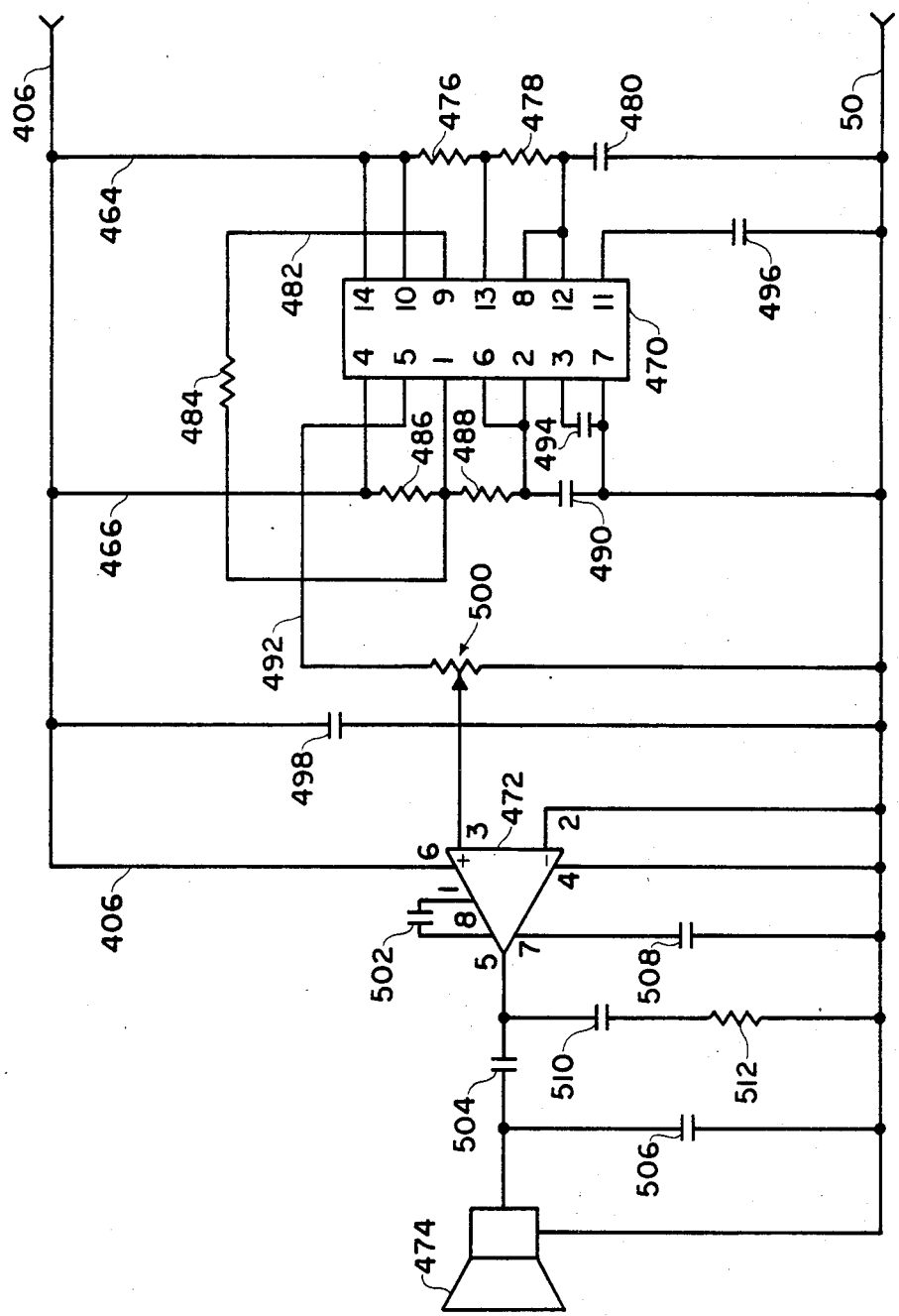
FIG. 7 is a schematic diagram showing an alarm speaker, alarm amplifier, and dual alarm oscillator of the present invention.

Referring next to FIG. 7, an alarm speaker, alarm amplifier, and dual alarm oscillator of the present invention are shown in a schematic diagram. Lines 406, 464, and 466 provide timed +V to a 556 dual timer 470 and an LM-386 amplifier 472. Both components are grounded via line 50. Dual timer 470 is utilized in the astable (oscillator) mode to provide a two-tone audio alarm which, in turn, is amplifier 472 and reproduced by a speaker 474. The speaker is affixed to the inside top surface of the noise alarm housing 12 and below speaker grille 14 (FIG. 1). A first astable multivibrator of dual timer 470 contains timing resistors 476 and 478, and a timing capacitor 480. Charging time of capacitor 480 is determined by the values of both resistors in series with the capacitor. Discharging time is determined by resistor 478 and the capacitor. The resistors and associated capacitor are chosen to provide a 4 Hz frequency which, in turn, is conducted from the astable output (pin 9), through line 482 and resistor 484, to timing resistors of a second astable multivibrator of dual timer 470.

Timing resistors 486 and 488 and timing capacitor 490 of the second astable are selected to provide a nominal 1 kHz frequency. Since resistor 484 works in parallel with timing resistor 486, the 1 kHz frequency is modified eight times a second as the 4 Hz astable cycles from logical "0" to logical "1" and back again. The resulting square wave output appears on line 492, and produces a distinct two-note tone. Control voltage inputs (pins 3 and 11) are bypassed to ground via capacitors 494 and 496. An additional capacitor 498 is connected between +V line 406 and ground line 50 to decouple amplifier 472.

The astable output on line 492 is connected to ground via a resistive element of a trimmer potentiometer 500, which has its wiper terminal connected to the noninverting input of amplifier 472. As in amplifier 138 (FIG. 3), the inverting input is shorted to ground, and the amplifier gain set to 200 by a capacitor 502. A capacitor 504 couples the amplifier output with speaker 474, and two small bypass capacitors 506 and 508 stabilize the amplifier output. To prevent unwanted RF oscillation, a capacitor 510 and resistor 512 form a series network which is connected between the amplifier output and ground line 50.

When the alarm timer of dual timer 304 (FIG. 5) is triggered, a 2.5-second logical "1" voltage is conducted via line 322, causing alarm driver transistor 400 (FIG. 6) to conduct and, in turn, provide dual alarm oscillator 470 and amplifier 472 with 2.5 seconds of power on lines 406, 464, and 466. Thus, a two-tone alarm is clearly heard when noise alarm 10 detects excessive classroom noise or when student tampering occurs. Potentiometer 500 is adjusted to provide optimal volume for the alarm.

Referring now to FIG. 8, the detail of a "volume level" rotary switch of the present invention is shown in a schematic diagram. As previously described with reference to FIG. 3, a non-shorting (break-before-make), 3-pole, 12-position rotary switch 18 is used in place of a conventional potentiometer for volume level adjustment, so that a sensor circuit can be included which senses when the switch position is altered by student tampering. A first ring (rotating contact arm) 514 of switch 18 provides selective contact between audio input line 160, one of eleven resistors 516, 518, 520, 522, 524, 526, 528, 530, 532, 534, and 536, and audio output line 164. A second ring 538 provides simultaneous selective contact between ground line 162, one of eleven resistors 540, 542, 544, 546, 548, 550, 552, 554, 556, 558, and 560, and audio output line 164. The values for resistors 516-536 can be as follows: 16, 15, 13, 11, 10, 8.2, 6.2, 4.7, 3.3, 1.6, and 0.5 ohms, respectively. The values for resistors 540-560 can be: 0.5, 1.6, 3.3, 4.7, 6.2, 8.2, 10, 11, 13, 15, and 16 ohms, respectively.

With the above arrangement, rotary switch 18 can select any one of 11 voltage dividers which, in turn, provide 11 volume level settings, from low to high level, when switch 18 is rotated in a clockwise direction. Although the resistor values given above do not completely simulate a linear taper potentiometer (which, of course, provides an infinite number of volume settings), volume level rotary switch 18 provides an adequate number of volume settings which are used to control the input sensitivity of an associated sound-actuated switch (FIG. 3). When the indexed knob of rotary switch 18 is in a "0" position, audio input line 160 is connected with resistor 516 (16 ohms), audio output line 164, resistor 540 (0.5 ohms), and ground line 162, providing a very low audio level on line 164. When the index knob of switch 18 is in a "10" position, audio input line 160 is connected with resistor 536 (0.5 ohms), audio output line 164, resistor 560 (16 ohms), and ground line 162, providing a very high audio level on line 164. As was previously noted, switch position "12" (between indexed positions "0" and "10") can be used when the instructor wishes to only charge battery 62 at a 100 mA rate, since the #12 terminals of the first and second poles of the rotary switch are left unconnected, thus disabling associated alarm circuitry.

A third ring 562 of rotary switch 18 provides simultaneous selective contact between ground line 162, one of twelve switch positions, and sensor line 168. Since rotary switch 18 is non-shorting, sensor line 168 remains at logical "0" until the switch is rotated to a new position. When ring 562 is rotated to a new position, the momentary break allows an associated pull-up resistor 170 (FIG. 3) to briefly drive line 168 high and, thereby, trigger "tamperproof" circuitry of the noise alarm. Thus, if a student attempts to reduce the sensitivity setting of the noise alarm after the instructor has closed lock switch 84 (FIG. 2), the two-tone alarm will sound repeatedly in conjunction with associated LED readout counts, until lock switch 84 and power switch 26 are again opened.

Figure 9:
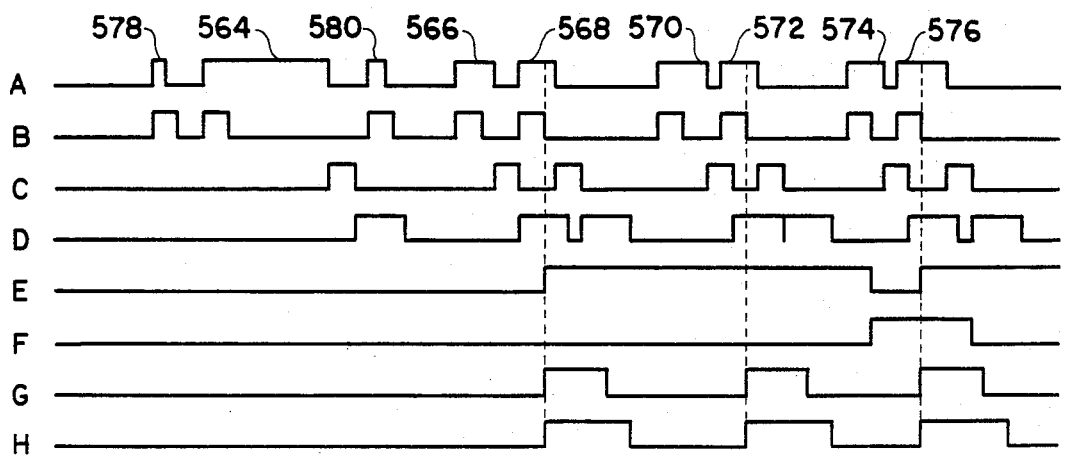
FIG. 9 is a diagram of the timing waveforms of the present invention.

Referring last of all to FIG. 9, the timing waveforms of the present invention are diagrammatically shown. Waveform A represents classroom noise which is of sufficient intensity to be detected by the tamperproof classroom noise alarm. Waveform B shows the output of a 1-second "noise inhibit" timer of dual timer 212 (FIG. 4), which is immediately triggered by noise of waveform A. As previously described, the 1-second noise inhibit timer prevents any noise from triggering a 1-second "enable" timer, unless that noise exceeds 1 second in duration. Waveform C shows the output of a 1-second enable timer of quad timer 254 (FIG. 4), which is triggered only by the trailing edge of noises 564, 566, 568, 570, 572, 574, and 576. A short-duration noise 578, such as that of a book falling to the floor, and noise 580, a door slam, do not trigger the 1-second enable timer.

Waveform D shows the output of a 2-second "window" timer of quad timer 254, which is triggered by the trailing edge of the enable timer output. When "delay on/off" switch 24 (FIG. 5) is "off," any valid noise occuring during the 2-second "window" output causes immediate actuation of the alarm sounding means. Waveform G shows a 2.5-second output of the "alarm" timer of dual timer 304 (FIG. 5). Noise 566, which exceeds 1 second in duration, triggers the 1-second enable timer which, in turn, triggers the 2-second window timer. Subsequent noise 568 coincides with the above 2-second "window," thereby triggering the alarm timer and actuating associated alarm sounding means. It should be noted that a prolonged noise 564, such as that of a recess bell, enables the alarm but does not actuate the audible sounding means, since an additional noise is necessary to trigger the alarm timer. Although an additional noise 580 does occur, it is less than 1 second in duration and is, therefore, ignored by the alarm.

Noise 568 additionally triggers a 13-second "delay" timer of quad timer 254, the output of which is shown in waveform E. Waveform F shows the output of a 4-second "window" timer, which is triggered by the trailing edge of the 13-second delay timer output. When delay switch 24 is "on," any valid noise occuring during the 4-second "window" output causes immediate actuation of the 2.5-second alarm timer. With switch 24 on, only noise 576 triggers the alarm timer and associated audible sounding means. With switch 24 off, noises 568, 572, and 576 trigger the alarm. Thus, the delay timer (waveform E) makes the noise alarm more tolerant of occassional classroom noise. Waveform H shows the output of a 3.5-second "alarm inhibit" timer of dual timer 212 (FIG. 4), which prevents noise of the alarm sounding means from triggering the 1-second enable timer (waveform C). For simplification, noise from the alarm sounding means is not shown in waveform A. A vertical dashed line is drawn from each noise which triggers the alarm timer (waveform G). Any of the above-shown timer outputs can be somewhat altered in duration to accomplish the same results. The specific timed outputs shown here are merely examples of what can be used.

Although power supply lines have been shown schematically for nearly all components of the tamperproof classroom noise alarm, supply line are presumed, but not shown, for individual gates and inverters in order to simplify drawings. Several bypass capacitors are also needed in conjunction with the various CMOS integrated circuits, and are presumed even though they are not shown.

The terms and expressions which have been employed in the foregoing drawings, abstract, and specification are used herein as terms of description and not of limitation; it being understood that changes may be made in the embodiment disclosed without departing from the spirit and scope of the invention as defined in the following claims.

What is claimed is:

1. A tamperproof classroom noise alarm for aiding the teacher in maintaining discipline comprising in combination:

power supply means for energizing said noise alarm when connected to an AC power source;

rechargeable battery means for energizing said noise alarm when not connected to an AC power source;

audible sounding means for providing an audible alarm in response to classroom noise exceeding a predetermined intensity and duration;

first switching means for simultaneously controlling said power supply means and said rechargeable battery means of said noise alarm;

second switching means and associated charge circuit means for selectively charging said rechargeable battery means at a "slow" or "trickle" rate;

a microphone and associated amplifying means for detecting and amplifying noise occuring within a school classroom;

adjustable resistance means coupled to the output of said amplifying means for setting the sensitivity of said noise alarm by selectively adjusting the amplified noise signal of said amplifying means;

sound-actuated switch means coupled to the output of said adjustable resistance means for providing a noise-generated logical control signal in direct proportion to the duration of said amplified noise signal;

third switching means connected to the output of said sound-actuated switch means for blocking conduction of said noise-generated logical control signal when said third switching means are in a "hold" position;

first gating means operatively associated with said third switching means for selectively transmitting said noise-generated logical control signal;

first timing means operatively associated with said third switching means and said first gating means for enabling said first gating means when said noise-generated logical control signal exceeds a predetermined duration;

second timing means operatively associated with said first gating means and said audible sounding means of said noise alarm for disabling said first gating means when said audible sounding means are actuated;

third timing means operatively associated with the output of said first gating means for enabling alarm circuitry of said noise alarm in response to a first noise-generated logical control signal of a first noise signal exceeding a predetermined intensity and duration;

fourth timing means operatively associated with said third timing means for providing a predetermined, timed interval during which a second noise-generated logical control signal of a second noise signal, exceeding a predetermined intensity and duration and which closely follows said first noise signal, causes actuation of said audible sounding means;

second gating means enabled by the output of said fourth timing means for transmitting said second noise-generated logical control signal when said second noise-generated logical control signal occurs during said predetermined, timed interval of said fourth timing means;

fifth timing means associated with the output of said second gating means for providing a predetermined, timed delay before said audible sounding means can be actuated by a second noise-generated logical control signal when said noise alarm is switched to a "delay" mode;

sixth timing means operatively associated with said fifth timing means for providing a predetermined, timed interval during which said second noise-generated logical control signal, occuring subsequent to a timed delay of said fifth timing means, causes actuation of said audible sounding means when said noise alarm is switched to said "delay" mode;

fourth switching means for selectively switching said noise alarm to said "delay" mode;

third gating means operatively associated with the output of said sixth timing means and said fourth switching means for providing an enabling signal only during said predetermined, timed interval of said sixth timing means when said noise alarm is switched to said "delay" mode and for providing a continuous enabling signal when said noise alarm is not switched to said "delay" mode;

fourth gating means operatively associated with the output of said third gating means and said second gating means for transmitting said second noise-generated logical control signal and causing actuation of said audible sounding means when (1) said noise alarm is switched to said "delay" mode and said second noise-generated logical control signal occurs during said predetermined, timed interval of said sixth timing means, and (2) said noise alarm is not switched to said "delay" mode and said second noise-generated logical control signal occurs during said predetermined, timed interval of said fourth timing means;

oscillator means for repeatedly actuating said audible sounding means in response to student tampering with said noise alarm;

fifth gating means operatively associated with the output of said fourth gating means and oscillator means for initiating actuation of said audible sounding means in response to a noise-generated logical control signal or to student tampering with said noise alarm;

seventh timing means operatively associated with the output of said fifth gating means for energizing said audible sounding means during a predetermined, timed interval;

counting means operatively associated with the output of said seventh timing means for counting the number of times said audible sounding means are actuated;

eighth timing means operatively associated with a reset terminal of said seventh timing means and reset terminals of said counting means for resetting said seventh timing means and counting means during a predetermined, timed interval subsequent to initial power-up of said noise alarm by closing said first switching means;

digital readout means operatively associated with the outputs of said counting means for visually displaying the number of times said audible sounding means are actuated;

fifth switching means for selectively resetting said counting means to zero;

sixth gating means operatively associated with said fifth switching means and the output of said eighth timing means for resetting said counting means to zero in response to closure of said fifth or first switching means;

low battery indicator means for providing the teacher with visual indication of when said rechargeable battery means need additional charging;

sixth switching means operatively associated with the output of said rechargeable battery means and a seventh gating means for supplying battery power to said noise alarm when said first switching means are open and for enabling said seventh gating means;

a plurality of sensing means operatively associated with said power supply means, microphone, adjustable resistance means, third switching means, fourth switching means, and fifth switching means for providing a tamper-generated logical control signal to said seventh gating means in response to student tampering with said first switching means, microphone, adjustable resistance means, third, fourth, and fifth switching means; and a silicon controlled rectifier operatively associated with the output of said seventh gating means and said oscillator means for energizing said oscillator means in response to student tampering with said noise alarm, the output of said oscillator means being operatively associated with said fifth gating means for repeatedly actuating said audible sounding means until said first and sixth switching means are opened.

2. A tamperproof classroom noise alarm according to claim 1, wherein said second switching means and associated charge circuit means further comprise:

first and second current-limiting resistors in association with said second switching means for selectively charging said rechargeable battery means at a trickle rate in a first switch position of said second switching means and at a slow rate in a second switch position of said second switching means during normal operation of said noise alarm.

3. A tamperproof classroom noise alarm according to claim 1, wherein said adjustable resistance means further include:

a plurality of fixed resistors; and a non-shorting, multi-pole, multi-position rotary switch, the first and second poles thereof being utilized to form a plurality of voltage dividers for selectively controlling the volume level of said amplified noise signal, the third pole of said rotary switch being utilized to sense when said rotary switch is rotated to a new position.

4. A tamperproof classroom noise alarm according to claim 3, wherein said adjustable resistance means further comprise:

an indexed control knob operatively associated with said rotary switch, the index of said control knob corresponding to a plurality of voltage divider positions, from a low volume level to a high volume level, for selectively setting the sensitivity of said noise alarm.

5. A tamperproof classroom noise alarm according to claim 1, further comprising a noise monitor and alarm indicating means comprising a light-emitting diode operatively associated with the output of said sound-actuated switch means, said light-emitting diode being illuminated in synchronization with the output of said sound-actuated switch means for visual indication of when classroom noise is of sufficient intensity to enable said noise alarm, and for visual indication of when said audible soundingmens are actuated.

6. A tamperproof classroom noise alarm according to claim 1, wherein said plurality of sensing means further comprise:

a photodetector mounted in close proximity to said microphone for providing said tamper-generated logical control signal when a student attempts to cover said microphone with his hand or other sound-absorbing material.

7. A tamperproof classroom noise alarm according to claim 1, wherein said sixth switching means further comprise:

a lock switch requiring a key to open or close said lock switch.

8. A tamperproof classroom noise alarm according to claim 1, wherein said third switching means further include:

a light-emitting diode operatively associated with said third switching means, said light-emitting diode being illuminated when said third switching means are in a "hold" position for providing students and teacher with a visual "hold" indicator.

9. A tamperproof classroom noise alarm according to claim 1, wherein said counting means further include:

decade counters for counting from "00" to "99," said counters advancing one count in response to each actuation of said audible sounding means.

10. A tamperproof classroom noise alarm according to claim 1, wherein said digital readout means further comprise:

7-segment light-emitting diodes for displaying the number of times said audible sounding means are actuated and further providing a visual "power-on" indicator when said noise alarm is powered.

11. A tamperproof classroom noise alarm according to claim 1, wherein said first timing means further comprise:

a short duration monostable multivibrator for preventing an operatively associated said first gating means from transmitting any short duration noise-generated logical control signals.

12. A tamperproof classroom noise alarm according to claim 1, wherein said third timing means further comprise:

a short duration monostable multivibrator triggered by the trailing edge of said noise-generated logical control signal for preventing the enabling of alarm circuitry of said noise alarm until a classroom noise signal of any duration has ceased.

* * * * *